United States Patent [19]
Protopapas

[11] Patent Number: 6,119,089
[45] Date of Patent: Sep. 12, 2000

[54] AURAL TRAINING METHOD AND APPARATUS TO IMPROVE A LISTENER'S ABILITY TO RECOGNIZE AND IDENTIFY SIMILAR SOUNDS

[75] Inventor: Athanassios Protopapas, San Francisco, Calif.

[73] Assignee: Scientific Learning Corp., Berkeley, Calif.

[21] Appl. No.: 09/108,453

[22] Filed: Jul. 1, 1998

Related U.S. Application Data

[63] Continuation-in-part of application No. 09/045,279, Mar. 20, 1998.

[51] Int. Cl.[7] ................................................. G10L 21/02
[52] U.S. Cl. ........................................... 704/278; 434/185
[58] Field of Search ..................................... 704/278, 268, 704/269, 271; 434/185, 116, 169; 381/23.1

[56] References Cited

U.S. PATENT DOCUMENTS

| | | | |
|---|---|---|---|
| 5,362,240 | 11/1994 | Cave et al. | 434/157 |
| 5,583,969 | 12/1996 | Yoshizumi et al. | 395/2.63 |
| 5,737,719 | 4/1998 | Terry | 704/224 |
| 5,813,862 | 9/1998 | Merzenich et al. | 434/185 |

OTHER PUBLICATIONS

L.R. Rabiner and R.W. Schafer, "Digital Processing of Speech Signals," Prentice–Hall, pp. 82–106, and 396–453.
Winifred Strange, "Speech Perception and Linguistic Experience, Issues in Cross–Language Research," York Press, pp. 358–359, 396–397, 418–421, and 428–429.

*Primary Examiner*—David R. Hudspeth
*Assistant Examiner*—Donald L. Storm
*Attorney, Agent, or Firm*—James D. Ivey

[57] ABSTRACT

A listener's ability to recognize and identify similar sounds is improved by forming exaggerated sounds which differ in spectral/temporal energy distribution from one another more than the similar sounds differ from one another and in generally the same way in which the similar sounds differ and testing the listener's ability to recognize and identify the exaggerated sounds. The exaggerated sounds are formed as follows: The similar sounds are spectrally transformed into a coordinate space and a linear function is projected between a pair of points representing the similar sounds in the coordinate space. Between the pair of points, the linear function represents a continuum of sounds between the similar sounds. To exaggerate the sounds, points are extrapolated outward from the pair of points along the linear function. An inverse transformation is applied to the extrapolated points to produce exaggerated sounds which differ from one another more than the similar sounds differ and in generally the same way that the similar sounds differ. Filtering extrapolation coefficients before extrapolating and filtering inverse transformation coefficients before applying the inverse transform provide pleasant, naturally sounding exaggerated sound.

9 Claims, 8 Drawing Sheets

AURAL TRAINING METHOD AND APPARATUS TO IMPROVE A LISTENER'S ABILITY TO RECOGNIZE AND IDENTIFY SIMILAR SOUNDS

SPECIFICATION

This is a continuation-in-part of co-pending U.S. patent application Ser. No. 09/045,279 filed Mar. 20, 1998.

FIELD OF THE INVENTION

The present invention relates to computer-assisted training systems and, in particular, to a particularly effective mechanism for training listeners to identify and recognize similar sounds.

BACKGROUND OF THE INVENTION

One of the more significant difficulties in learning a second language is the inability to recognize and identify some sounds, distinguishing the sounds from one another, when the distinction is not a component of a listener's native language. One example is the inability of a number of people who are native speakers of certain non-English languages, e.g., Japanese, to distinguish the sounds of the English language pertaining to the letters "r" and "l. " Such people have great difficulty in distinguishing such words as (i) "rock" and "lock," (ii) "rake" and "lake," and (iii) "right" and "light." Other distinctions of the English language which are difficult for some non-native English speakers include distinctions between "b" and "v," between "f" and "t," and between "f" and "p." Such non-native English speakers would have difficulty distinguishing, or be unable to distinguish, "bat" from "vat" or "theses" or "pieces" from "feces." Such inability makes comprehension of a second language particularly difficult and hinders such a person's ability to speak in the second language. The result is often a heavy accent which is difficult for native speakers of the second language to comprehend.

Such difficulty in perceiving similar but distinct sounds of spoken language are not limited to people attempting to learn a second language. Some people have specific impairments, such as language-learning impairments, in which some distinctions between similar sounds are not perceptible.

What is needed is a mechanism by which a listener can be trained to perceive subtle differences in similar sounds which sound identical to the listener.

SUMMARY OF THE INVENTION

In accordance with the present invention, each of a pair of sounds which are indistinguishable to a listener are exaggerated in such a way that the listener can distinguish the exaggerated sounds and such that the difference in spectral/temporal energy distribution between the pair of sounds is exaggerated. Specifically, the exaggerated sounds are more different from each other than are the original pair of sounds and differ in generally the same way, albeit to a greater degree, that the original pair of sounds differ. Since the exaggerated sounds differ more than the original pair of sounds differ, the listener can distinguish the exaggerated sounds. In addition, distinguishing the exaggerated sounds from one another helps the listener develop the ability to distinguish and recognize each of the original pair of sounds since the exaggerated sounds differ from one another in generally the same way that the original sounds differ from one another. The following example is illustrative.

Suppose that a non-native speaker of the English language cannot distinguish the respective sounds of the consonant "r" and the consonant "l." It should be noted that each of the consonant sounds are, in actuality, a class of sounds. For example, an English "r" can be uttered slightly different and still be recognized by native English speakers as an "r." For native English speakers, the class of sounds that are recognized as an "r" is distinct from the class of sounds that are recognized as an "l." An non-native English speaker or a person with a language learning impairment might not recognize those classes as distinct. Instead, that person recognizes the sounds as belonging to a single, indistinguishable class "r/l" of sounds whether an "r" or an "l" is spoken. According to the present invention, the "r" sound is exaggerated to form a new sound, referred to as "r++," and the "l" sound is exaggerated to form another new sound, referred to as "l++." While it's possible that "r" doesn't sound much like "r," "r++" sounds more different from "l" than does "r," and "r++" sounds more different from "l" in generally the same way that "r" sounds different from "l." Similarly, it's that possible that "l++" doesn't sound much like "l." However, "l++" sounds more different from "r" than does "l," and "l++" sounds more different from "r" in generally the same way that "l" sounds different from "r."

Even if the listener cannot recognize a sound as belonging to either an "r" class or an "l" class, the listener can recognize "r++" and "l++" as belonging to different classes of sound since "r++" and "l++" are more different than are "r" and "l." In accordance with the present invention, a trainer presents either the "r++" sound or the "l++" sound to the listener and asks the listener to identify the presented sound. Repeatedly doing so builds in the listener the ability to recognize "r++" and "l++" as sounds belonging to distinct classes which can be identified by the listener. By comparison, repeatedly asking the listener to identify a particular sound as either "r" or "l" would produce no results since the listener perceives the sounds as belonging to the same class of sounds.

Since "r++" and "l++" differ from one another in generally the same way that "r" and "l" differ from one another, building the ability of the listener to recognize "r++" and "l++" as distinct sounds establishes a perceptual distinction in approximately the place that a perceptual distinction between "r" and "l" should exist in the perception of the listener. As the listener becomes proficient in recognizing and identifying "r++" from "l++," the degree to which "r" and "l" are exaggerated is decreased. For example, "r" can be exaggerated to a smaller degree to form an exaggerated sound "r+." Similarly, "l" can be exaggerated to a smaller degree to form an exaggerated sound "l+." The listener is then asked to recognize and identify "r+" and "l+." Again, the perceptual distinction is in approximately the place that a perceptual distinction between "r" and "l" should exist in the perception of the listener since "r+" differs from "l+" in generally the way that "r" differs from "l."

The degree to which the sounds are exaggerated diminishes over time such that the exaggerated sounds recognized and identified by the listener are ever closer to the original sounds which were originally indistinguishable to the listener.

In accordance with the present invention, the exaggerated sounds are formed as follows. The original sounds of the pair are spectrally transformed into a coordinate space having one or more dimensions. The transformation can be, for example, a known vocal tract equivalent transformation. The transformation results in each sound of the pair being represented by a respective point in the coordinate space. A function is fit between the points of the pair of sounds. The function can be linear. Between the points of the pair, the function represents a continuous interpolation between the sounds of the pair. A pair of extrapolated points is determined by extrapolating along the function from each point of the pair away from the other point of the pair by a predetermined distance. By extrapolating along the projected function away from the pair of original points, the extrapolated points differ from one another by more than the difference between the original pair of points and differ along the same function. Filtering extrapolation coefficients prior to extrapolation provides particularly good results. The exaggerated sounds are formed by performing the inverse of the transformation upon the extrapolated points. Filtering inverse transformation coefficients prior to application of the inverse transformation provides particularly naturally sounding exaggerated sounds and provides particularly good results and a more pleasant experience for the listener. The exaggerated sounds differ more than do the original sounds of the pair and that difference is exaggerated. The difference is exaggerated in that the difference is greater in degree and substantially the same in type. For example, the difference between "r++" and "l++" is an exaggeration of the difference between "r" and "l" since "r++" and "l++" differ from one another more than do "r" and "l" and the way in which "r++" and "l++" differ from one another is generally the same as the way in which "r" and "l" differ from one another.

DETAILED DESCRIPTION

In accordance with the present invention, differences in spectral/temporal energy distribution between similar sounds are exaggerated to facilitate improvement of a listener's ability to recognize and distinguish the sounds. In particular, a trainer 100 (FIG. 1) retrieves a pair 102 of similar sounds 102A–B, forms therefrom a pair 106 of exaggerated sounds 106A–B, and tests the listeners ability to recognize and identify each of exaggerated sounds 106A–B. As the listener's ability to recognize and identify each of exaggerated sounds 106A–B improves, the amount by which exaggerated sounds 106A–B differ from sounds 102A–B is diminished to thereby further challenge the listener's ability to distinguish the sounds.

Figure 1:
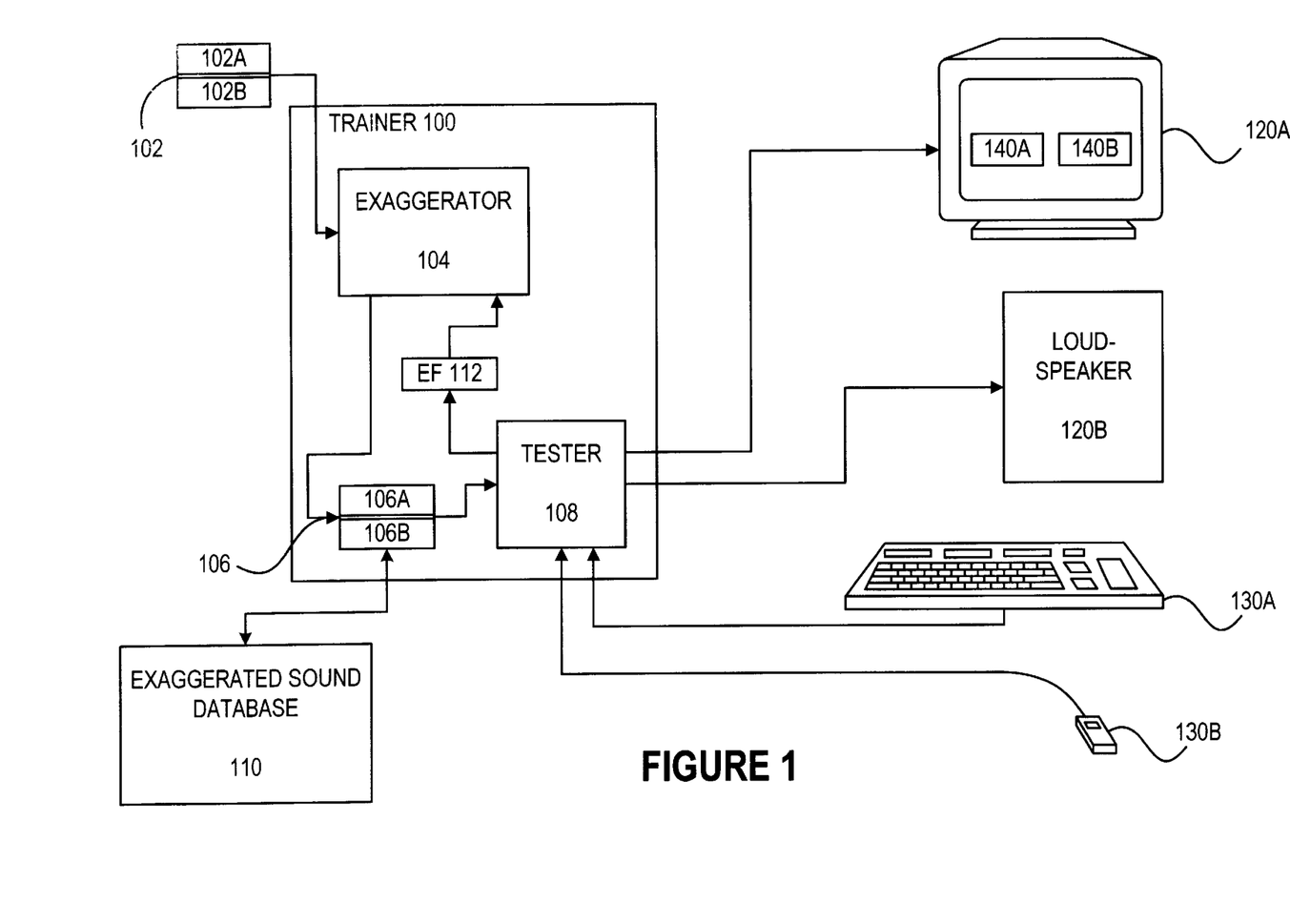
FIG. 1 is a block diagram of a trainer in accordance with the present invention.
Figure 2:
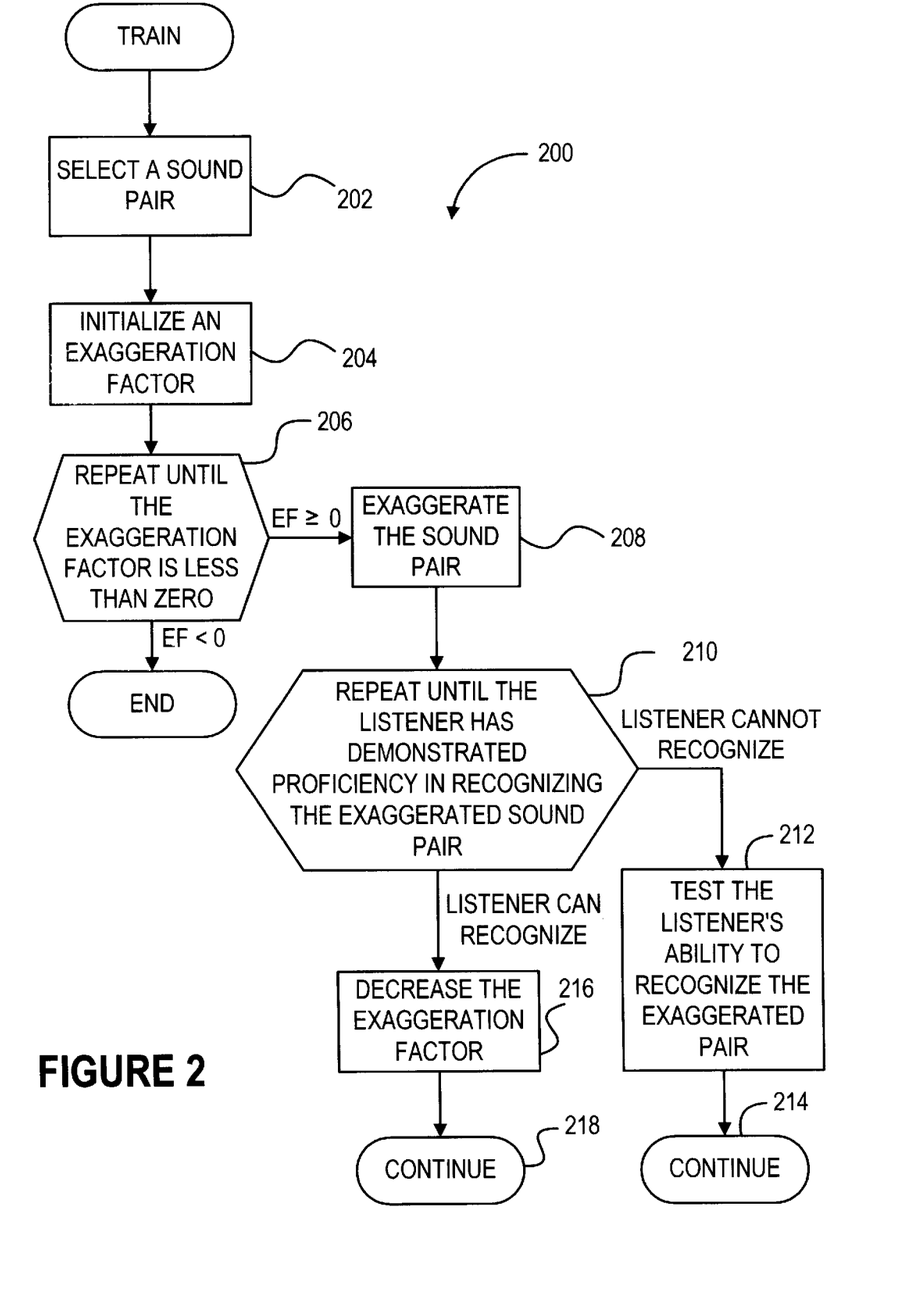
FIG. 2 is a logic flow diagram illustrating the training of a listener by the trainer of FIG. 1 in accordance with the present invention.

In this illustrative embodiment, trainer 100 is all or part of one or more computer processes. The processing of trainer 100 is shown in greater detail as logic flow diagram 200 (FIG. 2). Processing according to logic flow diagram 200 begins in step 202 in which trainer 100 (FIG. 1) selects pair 102 from a number of pairs of similar sounds. Examples of such pairs can include (i) "rock" and "lock," (ii) "bat" and "dat," (iii) "sip" and "chip," (iv) "fat" and "pat," and (v) "shoe" and "chew." In step 204 (FIG. 2), a tester 108 (FIG. 1) of trainer 100 initializes an exaggeration factor 112 to represent an initial degree of exaggeration. Tester 108 is that portion of trainer 100 which presents exaggerated sounds to the listener in the manner described below and which measures the listener's ability to distinguish between the exaggerated sounds in the manner described below.

Figure 3:
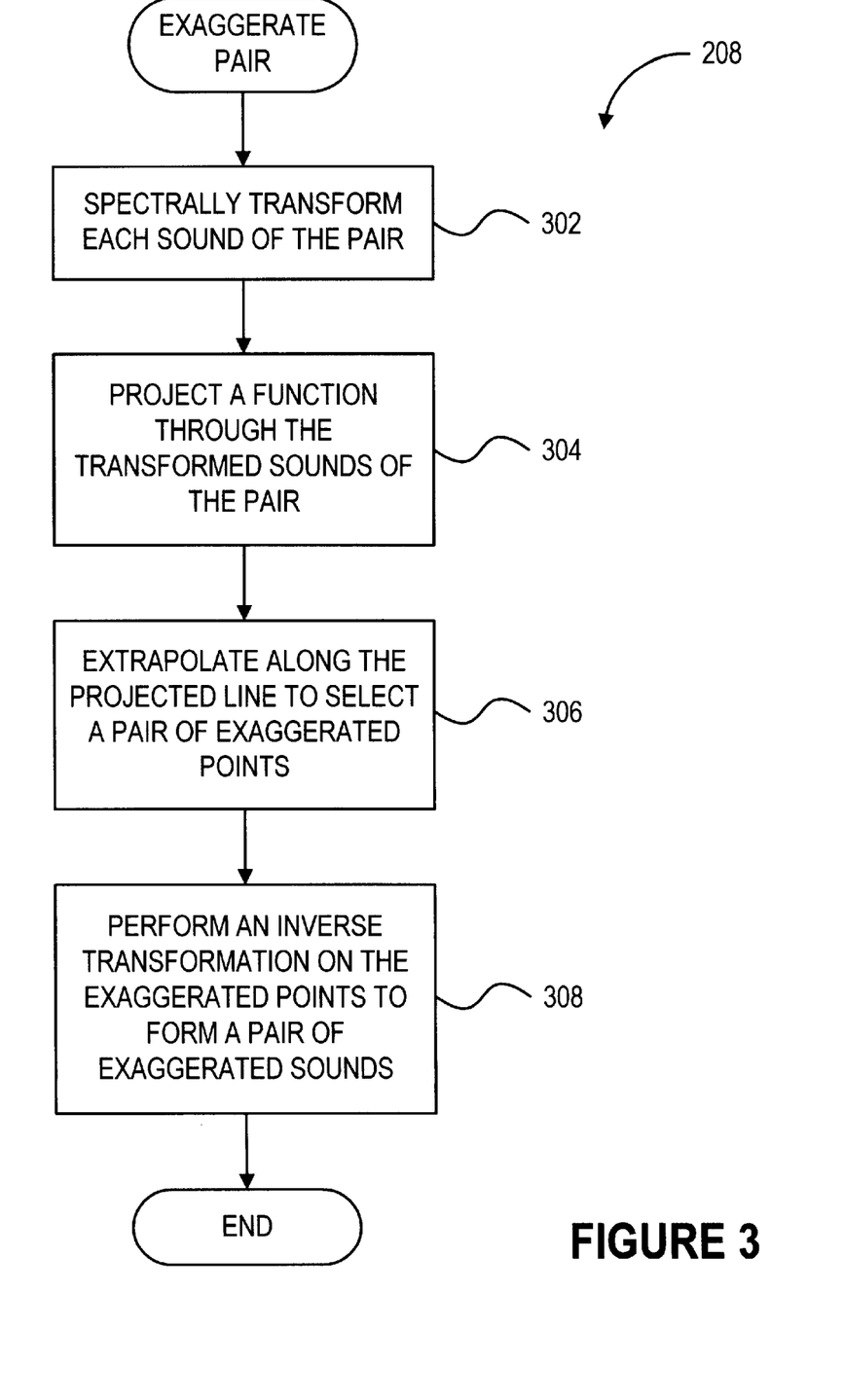
FIG. 3 is a logic flow diagram of the exaggeration of a pair of sounds by an exaggerator of the trainer of FIG. 1 in accordance with the present invention.

Loop step 206 and continue step 218 define a loop in which trainer 100 (FIG. 1) repeatedly performs steps 208 (FIG. 2) through 216 until exaggeration factor 112 (FIG. 1) is less than zero. In step 208 (FIG. 2), an exaggerator 104 (FIG. 1) of trainer 100 forms pair 106 of exaggerated sounds 106A–B from sounds 102A–B. Processing by exaggerator 104 in step 208 (FIG. 2) is shown in greater detail as logic flow diagram 208 (FIG. 3).

In step 302, exaggerator 104 (FIG. 1) spectrally transforms each of sounds 102A–B such that sounds 102A–B can be represented in a coordinate space having one or more dimensions. For example, after such transformation in step 302 (FIG. 3), sounds 102A–B (FIG. 1) are represented by points 402A–B (FIG. 4), respectively, in a coordinate space 400. Many such spectral transformations are known. In general, any spectral transformation of sounds 102A–B can produce acceptable results. Exemplary spectral transformations include transformations using (i) linear predictive coding (LPC) filter coefficients, (ii) LPC partial correlations (PARCOR) coefficients, (iii) perceptual linear predictive (PLP) coefficients, (iv) vocal tract equivalent log area ratio coefficients, (v) Fourier spectral magnitude, (vi) Fourier Spectrum complex coefficients, (vii) filterbank output envelope, (viii) ceptsral magnitude coefficients, and (ix) complex cepstrum coefficients. For reasons described more completely below, vocal tract equivalent modeling transformations produce particularly good results.

In step 304 (FIG. 3), exaggerator 104 (FIG. 1) projects a function 404 (FIG. 4) through points 402A–B in coordinate space 400. In this illustrative embodiment, function 404 is linear. In other, alternative embodiments, function 404 is non-linear. For example, function 404 can be exponential or logarithmic. A portion of 404A of function 404 between points 402A–B represents a continuous spectrum of sound between sounds 102A–B (FIG. 1). The length of portion 404A (FIG. 4), i.e., the distance between points 402A–B along function 404A, represents an amount of difference between sounds 102A–B (FIG. 1).

Figure 4:
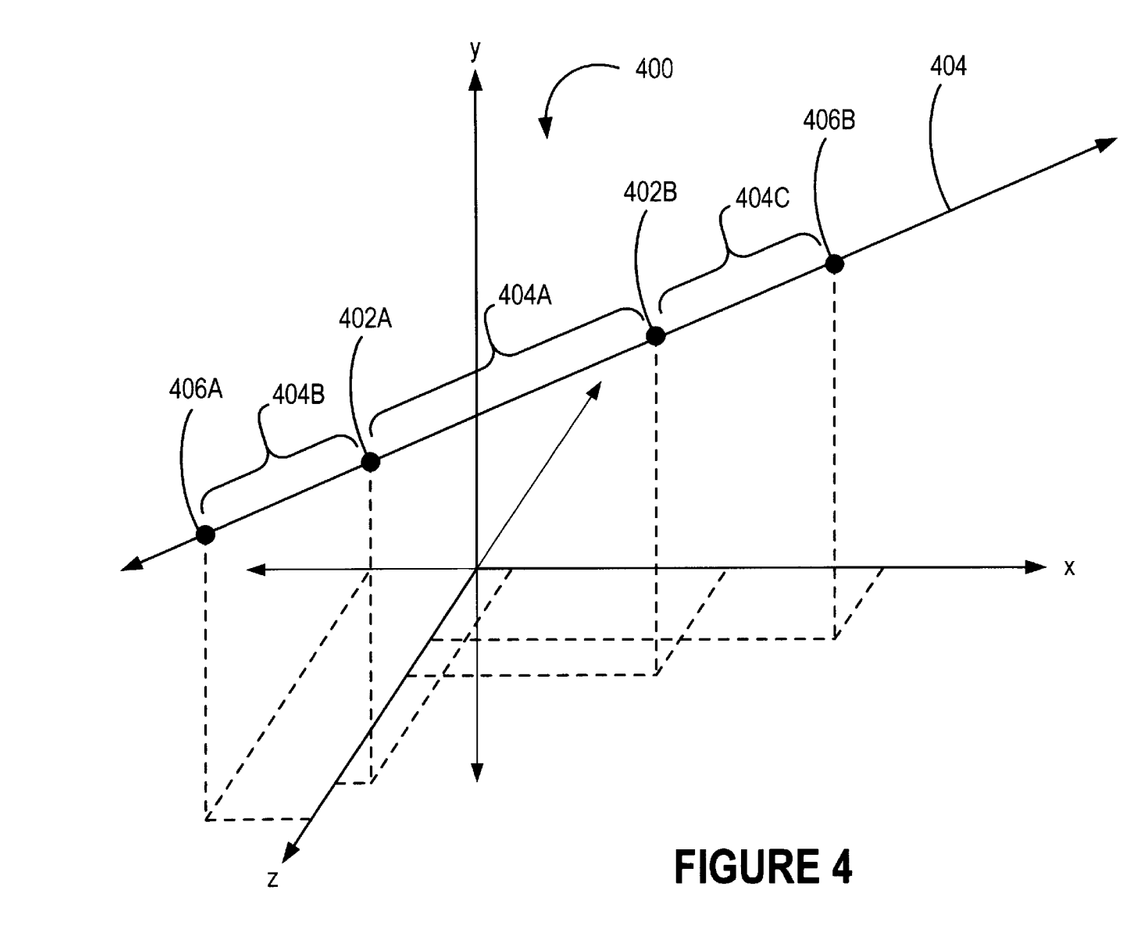
FIG. 4 is a representation of a pair of sounds and corresponding exaggerated sounds spectrally transformed into a multi-dimensional space in accordance with the present invention.

In step 306 (FIG. 3), exaggerator 104 (FIG. 1) forms points 406A–B (FIG. 4) which are representative of exaggerated points 106A–B (FIG. 1) in coordinate space 400 (FIG. 4). In particular, exaggerator 104 (FIG. 1) extrapolates a point 406A (FIG. 4) along function 404 from point 402A in a direction away from point 402B. As a result, point 406A is further from point 402B than is point 402A is the same direction that point 402A is from point 402B. Since point 406A represents exaggerated sound 106A (FIG. 1), exaggerated sound 106A differs from sound 102B more than sound 102A differs from sound 102B and in generally the same way that sound 102A differs from sound 102B. Similarly, exaggerator 104 (FIG. 1) extrapolates a point 406B (FIG. 4) along function 404 from point 402B in a direction away from point 402A. As a result, point 406B is further from point 402A than is point 402B is the same direction that point 402B is from point 402A. Since point 406B represents exaggerated sound 106B (FIG. 1), exaggerated sound 106B differs from sound 102A more than sound 102B differs from sound 102A and in generally the same way that sound 102B differs from sound 102A.

The distance of portion 404B (FIG. 4) along function 404 from point 402A to extrapolated point 406A as determined by exaggerator 104 (FIG. 1) is controlled by exaggeration factor 112. In one embodiment, the distance of portion 404B (FIG. 4) is relative to the distance of portion 404A between points 402A and 402B and exaggeration factor 112 (FIG. 1) represents a ratio between the respective distances of portions 404B (FIG. 4) and 404A. Similarly, the distance of a portion 404C along function 404 between extrapolated point 406B and point 402B as determined by exaggerator 104 (FIG. 1) is controlled by exaggeration factor 112 which represents a ratio between the respective distances of portions 404C (FIG. 4) and 404A. In this illustrative embodiment, exaggeration factor 112 (FIG. 1) is initialized in step 204 (FIG. 2) to represent a ratio of 0.5 and is decreased in step 216, as described more completely below, in decrements of 0.05. It is appreciated that other initial values and decrements for exaggeration factor 112 (FIG. 1) can also provide relatively good results.

In step 308 (FIG. 3), exaggerator 104 (FIG. 1) performs the inverse of the transformation of step 302 (FIG. 3) upon extrapolated points 406A–B FIG. 4) to form exaggerated sounds 106A–B, respectively. As a result, exaggerated sound 106A differs from sound 102B more than sound 102A differs from sound 102B and, importantly, in generally the same way that sound 102A differs from sound 102B. In addition, exaggerated sound 106B differs from sound 102A more than sound 102B differs from sound 102A and in generally the same way that sound 102B differs from sound 102A.

Consider the example in which sounds 102A–B are "rock" and "lock," respectively. Point 402A (FIG. 4) represents "rock" in coordinate space 400, and point 402B represents "lock" in coordinate space 400. Extrapolated point 406A is formed by extrapolation along function 404 from point 402A in a direction away from point 402B, and exaggerated sound 106A is formed by performing an inverse transformation upon point 406A. It is appreciated that exaggerated sound 106A may sound very little lie "rock." However, exaggerated sound 106A sounds more different from "lock" than does "rock" and sounds more different than "lock" in generally the same way that "rock" sounds different from "lock." Analogously, exaggerated sound 106B is an exaggeration of "lock" and sounds more different from "rock" than does "lock" and sounds more different than "rock" in generally the same way that "lock" sounds different from "rock." Such is true even if exaggerated sound 106B sounds very little like "lock."

Figure 7:
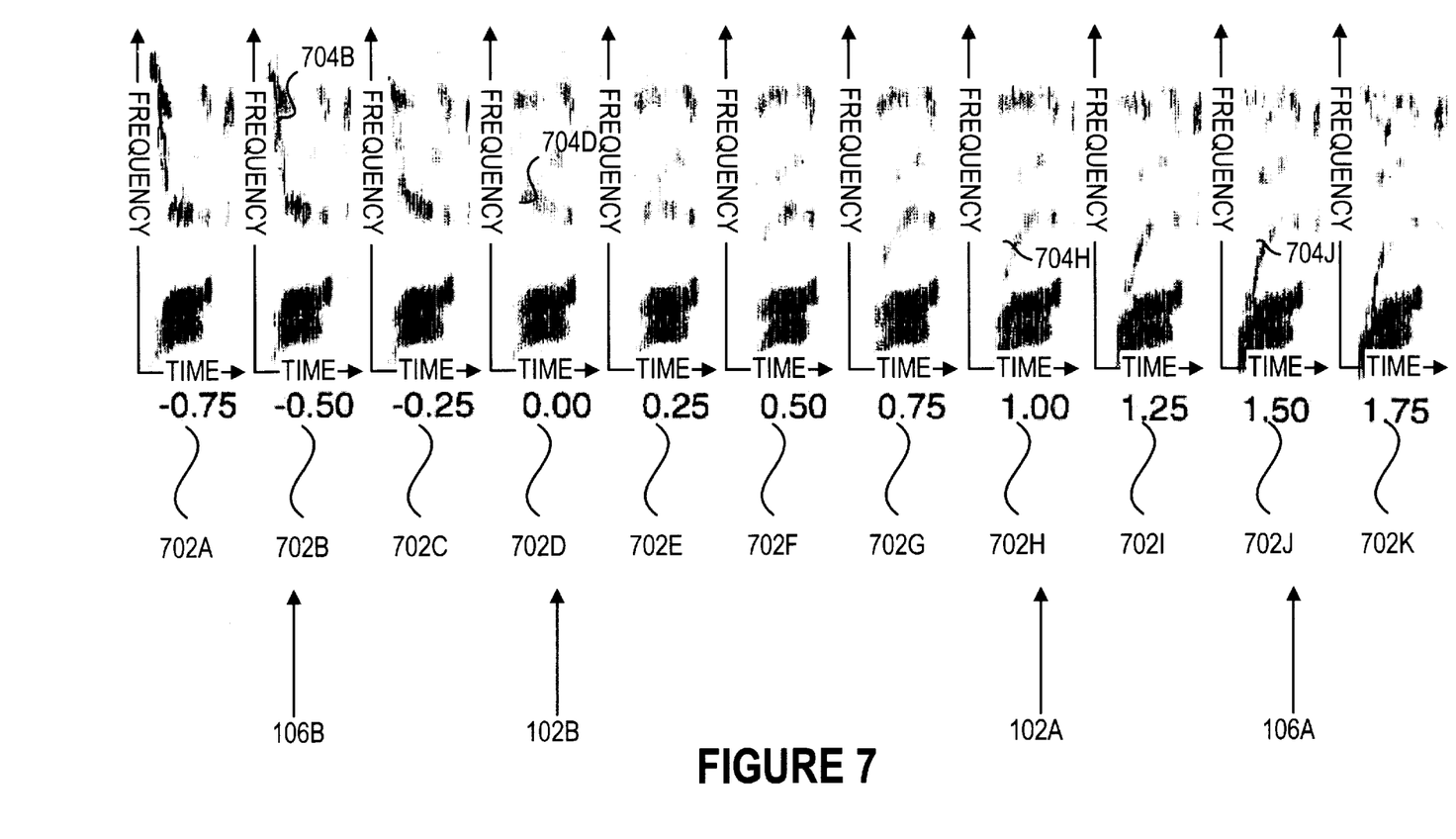
FIG. 7 is a collection of spectrograms illustrating exaggeration of the difference in spectral/temporal energy distribution between sounds to form exaggerated sounds in accordance with the present invention.

The manner in which exaggerated sounds 106A–B exaggerate differences between sounds 102A–B is shown in FIG. 7. Specifically, exaggerated sounds 106A–B exaggerated the difference in spectral/temporal distribution of energy of sounds 102A–B. In spectrograms 702A–K, energy in the form of sonic amplitude is plotted along time and frequency axes. Amplitude is shown as darker areas within the axes of time and frequency. The time domain shown is 265 milliseconds in duration, and the range of frequencies shown is 0–5.5 kHz. Below each of spectrograms 702A–K is an index identifying a point along function 400 (FIG. 4). Spectrogram 702D (FIG. 7) has an index of 0.0 and represents sound 102B, e.g., "lock" Spectrogram 702H (FIG. 7) has an index of 1.0 and represents sound 102A, e.g., "rock." Spectrograms 702E–G have indices between 0.0 and 1.0 and represent sounds interpolated between sounds 102A–B. Spectrograms 702D and 702H show a difference in spectral/ temporal energy distribution between sounds 102A–B, namely, an energy peak 704D which is relatively constant in frequency over time with only slight downward sweeping which is different from an energy peak 704H which sweeps dramatically from low frequency to generally the same relatively high frequency of energy peak 704D.

Exaggerated sound 106A is represented by spectrogram 702J, and exaggerated sound 106B is represented by spectrogram 702B. To exaggerate the difference between sounds 102A–B, exaggerated sound 106A has an energy peak 704J which starts at a lower frequency than does energy peak 704H and sweeps upward more dramatically, i.e., more quickly over time, that does energy peak 704H. In addition, exaggerated sound 106B has an energy peak 704B which starts higher and sweeps downward more dramatically that does energy peak 704D and therefore exaggerates the difference between sounds 102A–B. Specifically, exaggerated sounds 106A–B are formed by redistributing energy of sounds 102A–B, respectively, in a spectra/temporal space as shown in spectrograms 702A–K to emphasize differences between sounds 102A–B.

The result is thus a pair 106 (FIG. 1) of exaggerated sounds 106A–B that differ from one another more than do sounds 102A–B and in generally the same manner that sounds 102A–B differ from one another. The fact that exaggerated sounds 106A–B sound more different from one another than do sounds 102A–B enables the listener to recognize and identify exaggerated sounds 106A–B as distinct from one another. Such is so even if the listener is incapable of recognizing and identifying sounds 102A–B as distinct from one another. The fact that exaggerated sounds 106A–B differ from one another in generally the same way that sounds 102A–B differ from one another leverages, from the listener's ability to recognize and identify exaggerated sounds 106A–B, improvement in the listener's ability to recognize and identify sounds 102A–B.

As described briefly above, vocal tract equivalent modeling transformations produce particularly good results. Vocal tract equivalent modeling transformations are known but are described herein briefly for completeness. Vocal tract equivalent modeling transformations approximate the shape of the vocal tract of a human speaker forming a particular sounds with discrete, joined tubes which are represented mathematically. Extrapolation of a vocal tract equivalent model for sound 102A away from a vocal tract equivalent model for sound 102B involves accentuating differences between such vocal tract equivalent models. The resulting extrapolation is itself a vocal tract equivalent model and therefore approximates the shape of a vocal tract. Vocal tract modeling produces sounds which are generally of the same order and properties as natural speech. Accordingly, the result of inverse transformation of the extrapolated vocal tract equivalent is frequently a sound that theoretically can be produced by a human speaker. Waveforms produced by inverse vocal tract equivalent modeling transformations tend to have energy peaks in patterns and relations which are known to exist and are expected in oral speech. Thus, while exaggerated sounds 106A–B can be artificial in that they are not representative of any sounds made in an actual spoken language, using vocal tract equivalent modeling transformation to form exaggerated sounds 106A–B tends to ensure that exaggerated sounds 106A–B still sound like human speech. Such assists the listener in distinguishing nuances of human speech and sounds more natural and pleasing to the listener.

Once exaggerator 104 forms exaggerated sounds 106A–B in step 208 (FIG. 2), processing transfers to loop step 210 which, in conjunction with continue step 214, defines a loop in which tester 108 (FIG. 1) repeatedly performs step 212 until the listener has demonstrated proficiency in recognizing and identifying exaggerated sounds 106A–B (FIG. 1). In step 212 (FIG. 2), tester 108 (FIG. 1) presents either of exaggerated sounds 106A–B to the listener through a loudspeaker 120B and receives response signals generated by the listener through physical manipulation of user input devices 130A–B which identify one of exaggerated sounds 106A–B. In one embodiment, tester 108 displays buttons 140A–B in a computer display device 120A and associates buttons 140A–B with exaggerated sounds 106A–B, respectively. Tester 108 plays one of exaggerated sounds 106A–B though loudspeaker 120B, and the listener identifies one of exaggerated sounds 106A–B by clicking on one of buttons 140A–B using conventional user interface techniques and physical manipulation of user input devices 130A–B. If the sound identified by the user-generated signals is the sound presented by tester 108, the listener has successfully recognized and identify the presented one of exaggerated sounds 106A–B. If the sound identified by the user-generated signals is not the sound presented by tester 108, the listener has failed to recognize and identify the presented one of exaggerated sounds 106A–B.

Tester 108 can determine whether the listener has demonstrated proficiency in recognizing and identifying exaggerated sounds 106A–B in a number of ways. In one embodiment, tester 108 determines that the listener has demonstrated such proficiency when the listener has responded correctly to 80% of thirty (30) consecutive sounds. In an alternative embodiment, tester 108 determines that the listener has demonstrated such proficiency when the listener has responded correctly to three (3) consecutive sounds. When the listener has demonstrated proficiency in distinguishing exaggerated sounds 106A–B, processing transfers from loop step 210 (FIG. 2) to step 216.

In step 216, tester 108 (FIG. 1) decreases exaggeration factor 112. Processing transfers from step 216 (FIG. 2) through continue step 218 to loop step 206 in which steps 208–216 are repeated until exaggeration factor 112 (FIG. 1) is less than zero. Accordingly, exaggerator 104 again forms exaggerated sounds 106A–B from sounds 102A–B in the manner described above with respect to logic flow diagram 208 (FIG. 3) and FIG. 4. However, since tester 108 (FIG. 1) decreases exaggeration factor 112 in step 216 (FIG. 2), exaggerated sounds 106A–B are now a little closer to one another than they were in the previous iteration of the loop of steps 206–218 (FIG. 2). Accordingly, the listener's ability to recognize and identify exaggerated sounds 106A–B (FIG. 1) is challenged to a greater degree and is therefore improved. In addition, exaggerated sounds 106A–B are also a little closer to sounds 102A–B, respectively. Therefore, as the listener develops the ability to distinguish sounds which are ever closer to sounds 102A–B, the listener eventually develops the ability to distinguish sounds 102A–B themselves.

Figure 6:
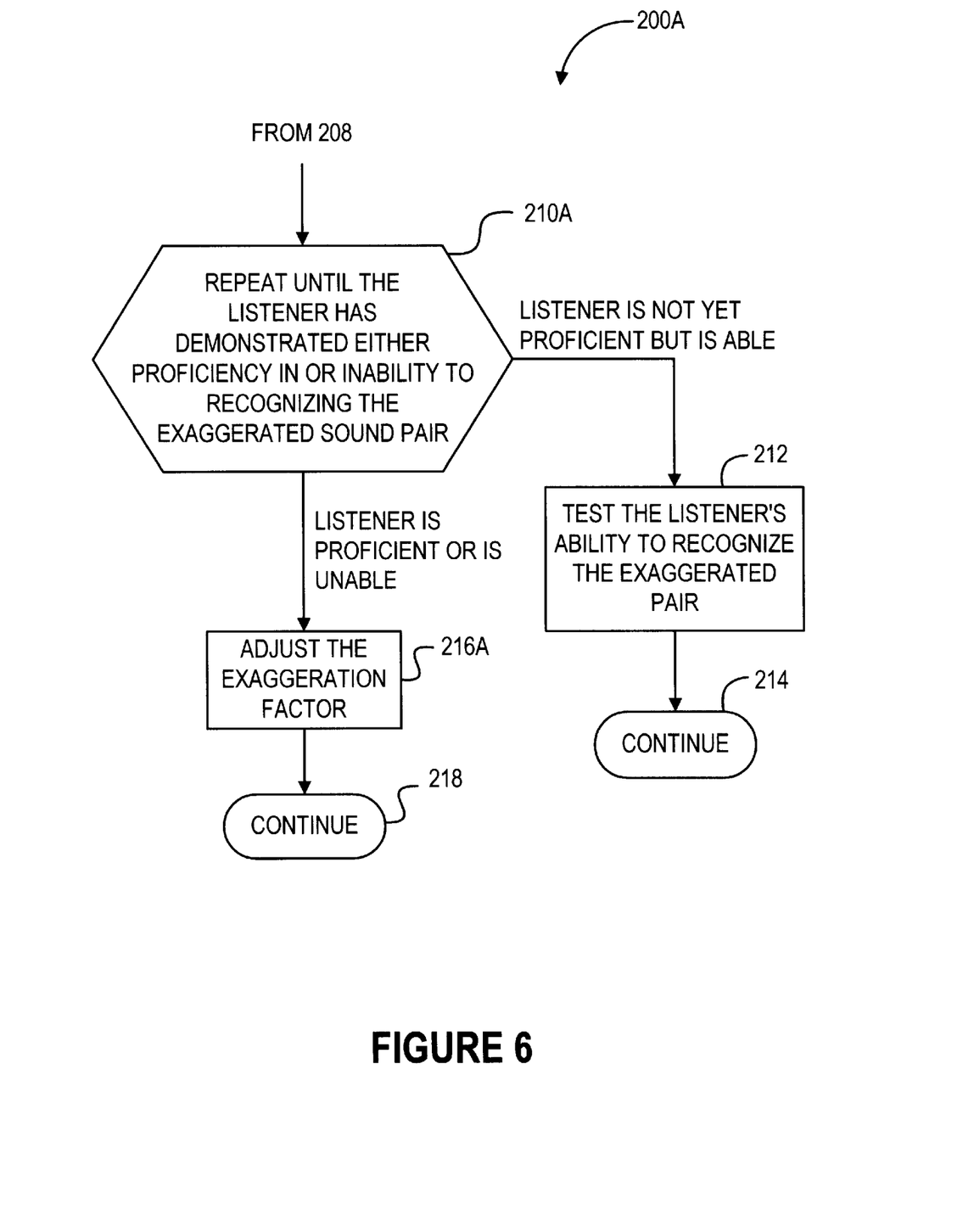
FIG. 6 is a logic flow diagram illustrating a part of the training of a listener by the trainer of FIG. 1 in accordance with an alternative embodiment of the present invention.

FIG. 6 shows steps 210A and 216A of a logic flow diagram 200A which is otherwise analogous to logic flow diagram 200 (FIG. 2). Steps 210A (FIG. 6) and 216A correspond to steps 210 (FIG. 2) and 216 in an alternative embodiment of tester 108. In loop step 210A (FIG. 6), tester 108 determines (i) whether the listener has demonstrated proficiency in recognizing and identifying exaggerated sounds 106A–B (FIG. 1) in the manner described above with respect to loop step 210 (FIG. 2) or (ii) whether the listener is unable to recognize and identify exaggerated sounds 106A–B (FIG. 1) with exaggeration factor 112 at its current setting. In step 216A (FIG. 6), tester 108 (FIG. 1) adjusts exaggeration factor 112 by an incremental amount. If the listener has demonstrated proficiency, tester 108 decrements exaggeration factor 112 in the manner described above with respect to step 216 (FIG. 2). Conversely, if the listener has demonstrated inability, tester 108 FIG. 1) increments exaggeration factor 112 by the incremental amount. Accordingly, the difference between exaggerated sounds 106A–B is increased to make recognition and identification of exaggerated sounds 106A–B a little easier for the listener and to avoid frustrating the listener.

In the final iteration of the loop of steps 206–218 (FIG. 2), tester 108 (FIG. 1) has decreased exaggeration factor 112 to zero such that exaggerated sounds 106A–B are equivalent to sounds 102A–B, respectively. When the listener demonstrated proficiency in recognizing and identifying exaggerated sounds 106A–B in the loop of steps 210–214 (FIG. 2), the listener has demonstrated proficiency in recognizing and identifying sounds 102A–B (FIG. 1) and tester 108 decreases exaggeration factor 112 to a value less than zero. Accordingly, the loop of steps 206–218 (FIG. 2) and logic flow diagram 200 completes.

It should be noted that at the completion of logic flow diagram 200, the listener has demonstrated proficiency in recognizing and identifying sounds 102A–B (FIG. 1) as distinct from one another which the listener could not do prior to commencement of processing according to logic flow diagram 200 (FIG. 2). Of course, the training of the listener according to logic flow diagram 200 can be divided among several sessions over a period of multiple days so as to avoid exhausting the attention and stamina of the listener. In addition, processing of pair 102 (FIG. 1) by trainer 100 can be concurrent and interleaved with processing by trainer 100 of other pairs in a directly analogous manner. For example, in one embodiment, tester 108 can test the listener's ability to recognize as distinct and identify exaggerated sounds corresponding to the pair of sounds "rock" and "lock" for a period of time and test the listener's ability to distinguish exaggerated sounds corresponding to a different pair of sounds before resuming training with respect to distinguishing "rock" and "lock."

Tester 108 can retrieve pair 102 and other pairs of similar sounds from a sound pair database 510 (FIG. 5) which is described more completely below. In one embodiment, sounds of pairs stored in sound pair database 510 are stored in a transformed state and are represented by data specifying a transformed point in coordinate space 400 (FIG. 4).

In addition, groups of pairs of sounds which are trained together can be organized according to the specific difference between sounds. For example, trainer 100 can intermingle training with respect to distinguishing sounds which differ only in the consonant "r" and the consonant "l." Trainer 100 can inter-mingle processing according to logic flow diagram 200 (FIG. 2) of the pair of sounds "rock" and "lock" with processing according to logic flow diagram 200 of the following additional pairs of sounds, (i) "right" and "light," (ii) "rake" and "lake," (iii) "rot" and "lot," and (iv) "rap" and "lap." In this illustrative embodiment, trainer 100 proceeds to pairs of sounds which differ from one another in ways other than the consonants "r" and "l" when the listener has shown proficiency in recognizing as distinct and identifying sounds of the "r/l" pairs listed above.

As described above, the tester 108 (FIG. 1) tests the listener's ability to recognize exaggerated sounds 106A–B as distinct from one another. In an alternative embodiment, tester 108 tests the listener's ability to recognize one of exaggerated sounds 106A–B as distinct from a complementary one of sounds 102A–B. For example, tester 108 tests the listener's ability to recognize exaggerated sound 106A as distinct from sound 102B and to recognize exaggerated sound 106B as distinct from sound 102A. In this embodiment, each of sounds 102A–B serves as a reference sound to which to compare exaggerated sounds 106B and 106A, respectively. In the embodiment described further above, each of the exaggerated sound 106A–B serves as a reference sound for the other of exaggerated sounds 106A–B.

In addition, exaggerator 104 of trainer 100 can form exaggerated pair 106 with various degrees of exaggeration specified by exaggeration factor 112 and can store multiple instances of exaggerated pair 106 in an exaggerated sound database 110. Accordingly, much of the processing required to form various instances of exaggerated pair 106 can be performed prior to the interacting testing of the listener by tester 108 in the manner described above. Tester 108 can retrieve a particular instance of exaggerated pair 106 corresponding to a particular degree of exaggeration represented by exaggeration factor 112 from exaggerated sound database 110.

Further improvements in the listener's ability to comprehend a particular language can be realized by following training as described above with language comprehension training as described in co-pending U.S. patent application Ser. No. 08/982,189 filed Dec. 17, 1997, now U.S. Pat. No. 5,927,988 by William M. Jenkins et al. and entitled "Method and Apparatus for Training of Sensory And Perceptual Systems in LLI Subjects" and that description is incorporated herein by reference. Such language comprehension training can be subsequent to and/or concurrent with training to recognize and identify distinct sounds in the manner described above.

Filtering to Improve Exaggerated Sounds

As described above, results in improving the ability of the listener to recognize similar sounds as distinct are better if exaggerated sounds 106A–B (FIG. 1) sound like sounds made by human speech. In addition, the listener's overall experience with trainer 100 is more pleasant when exaggerated sounds 106A–B seem more natural to the listener, as if exaggerated sounds 106A–B were indeed spoken by a human being. While extrapolation using vocal tract modeling in the manner described above provides relatively natural sounding exaggerated sounds, further improvements can be made as shown in logic flow diagrams 306 (FIG. 8) and 308 (FIG. 9).

Figure 8:
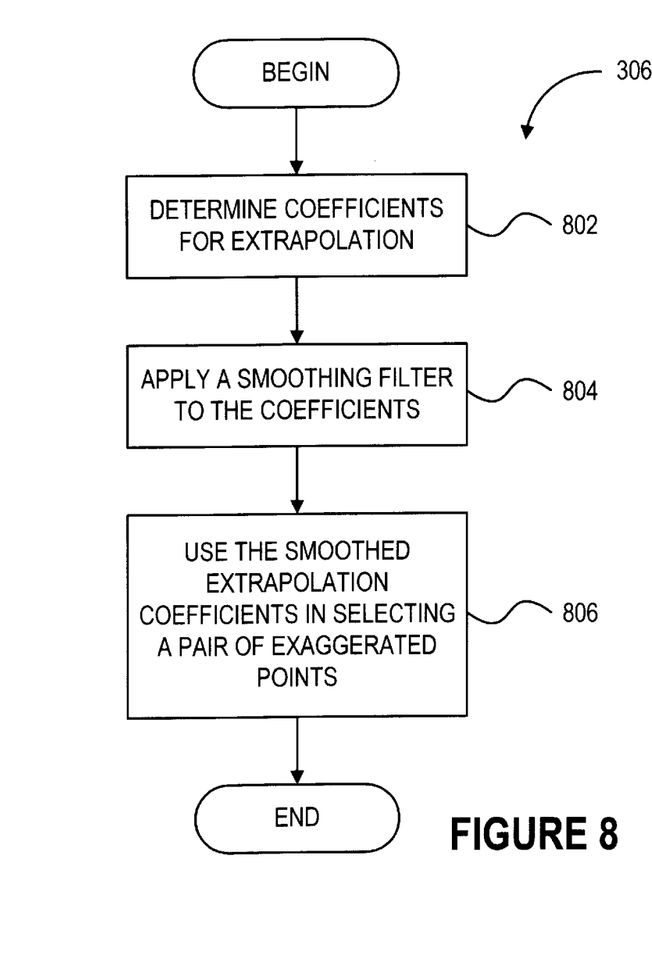
FIG. 8 is a logic flow diagram of the extrapolation along the spectrally transformed sound of FIG. 4 according to a step in FIG. 3.

Logic flow diagram 306 (FIG. 8) shows step 306 (FIG. 3) in greater detail. Briefly, application of a smoothing filter to coefficients used in extrapolating along function 400 (FIG. 4) in the manner described above produces smoother, more natural sounding exaggerated sounds. Specifically, trainer 100 (FIG. 1) determines the particular coefficients by which extrapolation along function 404 (FIG. 4) is to be performed in step 802 (FIG. 8). In step 804, trainer 100 (FIG. 1) applies a smoothing filter to the extrapolation coefficients. In one embodiment, the smoothing filter is a five-point Hamming window smoothing filter. In step 806 (FIG. 8), trainer 100 (FIG. 1) uses the filtered extrapolation coefficients to determine extrapolated points 406A–B (FIG. 4) in the manner described above. As a result of filtering in step 804 (FIG. 8), extreme, undesirable exaggerated sounds 106A–B (FIG. 1) are avoided. The result is that exaggerated sounds 106A–B, which are determined from extrapolated points 406A–B (FIG. 4) in the manner described above, sound more natural.

Logic flow diagram 308 (FIG. 9) shows step 308 (FIG. 3) in greater detail. Briefly, application of a smoothing filter to coefficients used in performing the inverse transformation of extrapolated points 406A–B (FIG. 4) to form exaggerated sounds 106A–B also makes exaggerated sounds 106A–B more natural sounding. Specifically, trainer 100 (FIG. 1) determines the particular coefficients used for such inverse transformation in step 902 (FIG. 9). In step 904, trainer 100 (FIG. 1) filters the transformation coefficients using a smoothing filter. In one embodiment, the smoothing filter is a five-point Hamming window smoothing filter. Trainer 100 uses the filtered transformation coefficients to perform the inverse transformation of extrapolated points 406A–B. (FIG. 4) in step 906 (FIG. 9). As a result of filtering the transformation coefficients in step 904 is that exaggerated sounds 106A–B have a more smooth, natural sound. The result is pleasing to the listener and provides particularly good results in improving the listener's ability to recognize similar sounds as distinct from one another.

Figure 9:
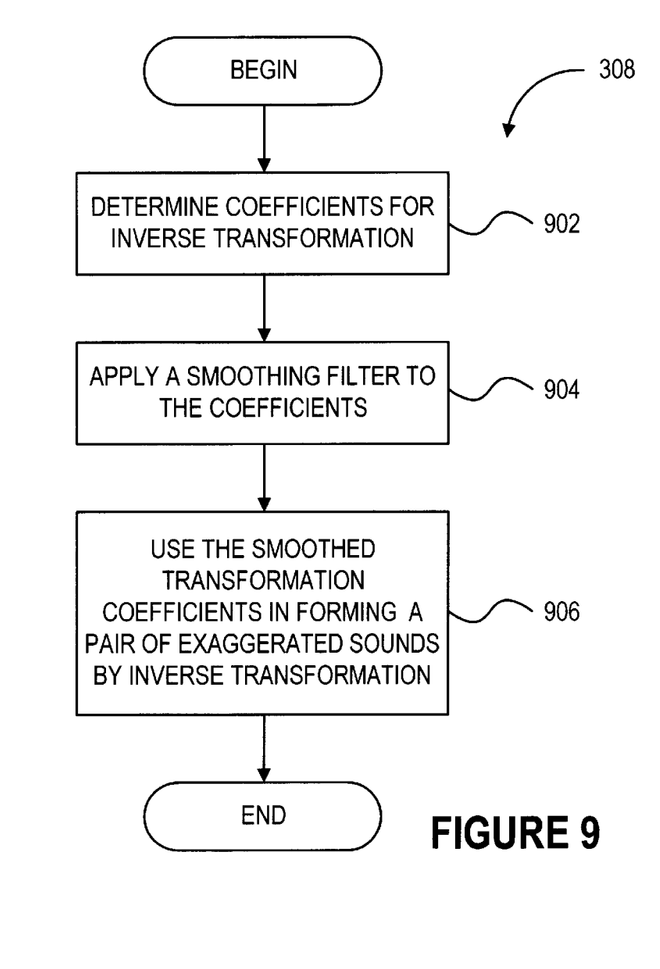
FIG. 9 is a logic flow diagram of the inverse transformation of the extrapolated sounds of FIG. 4 according to a step of FIG. 3.

Good results can be achieved using the filtering of either of logic flow diagrams 306 (FIG. 8) and 308 (FIG. 9) alone or using the filtering of both logic flow diagram 306 (FIG. 8) and 308 (FIG. 9).

Implementation of Trainer 100 in a Computer System

Figure 5:
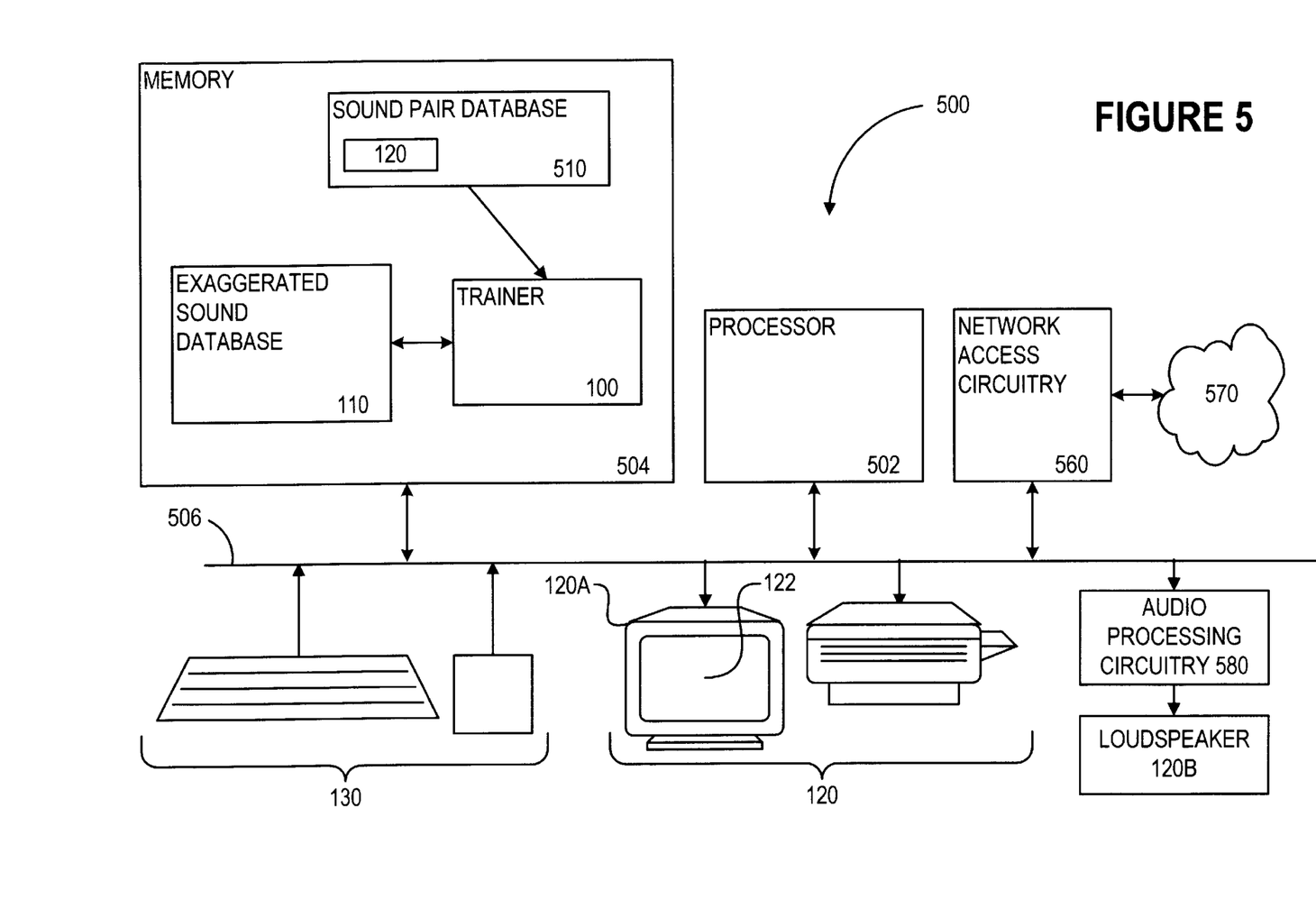
FIG. 5 is a block diagram of a computer system within which the trainer of FIG. 1 executes.

Trainer 100 executes within a server computer 500 which is shown in FIG. 5. Computer 500 includes a processor 502 and memory 504 which is coupled to processor 502 through an interconnect 506. Interconnect 506 can be generally any interconnect mechanism for computer system components and can be, e.g., a bus, a crossbar, a mesh, a torus, or a hypercube. Processor 502 fetches from memory 504 computer instructions and executes the fetched computer instructions. In addition, processor 502 can fetch computer instructions through a computer network 570 through network access circuitry 560 such as a modem or ethernet network access circuitry. Processor 502 also reads data from and writes data to memory 504 and sends data and control signals through interconnect 506 to one or more computer display devices 120 and receives data and control signals through interconnect 506 from one or more computer user input devices 130 in accordance with fetched and executed computer instructions.

Memory 504 can include any type of computer memory and can include, without limitation, randomly accessible memory (RAM), read-only memory (ROM), and storage devices which include storage media such as magnetic and/or optical disks. Memory 504 includes trainer 100 which is all or part of one or more computer processes which in turn executes within processor 502 from memory 504. A computer process is generally a collection of computer instructions and data which collectively define a task performed by computer 500.

Each of computer display devices 120 can be any type of computer display device including without limitation a printer, a cathode ray tube (CRT), a light-emitting diode (LED) display, or a liquid crystal display (LCD). Each of computer display devices 120 receives from processor 502 control signals and data and, in response to such control signals, displays the received data. Computer display devices 120, and the control thereof by processor 502, are conventional.

In addition, loudspeaker 120B can be any loudspeaker and can include amplification and can be, for example, a pair of headphones. Loudspeaker 120B receives sound signals from audio processing circuitry 580 and produces corresponding sound for presentation to the listener. Audio processing circuitry 580 receives control signals and data from processor 502 through interconnect 506 and, in response to such control signals, transforms the received data to a sound signal for presentation through loudspeaker 120B.

Each of user input devices 130 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 130 generates signals in response to physical manipulation by the listener and transmits those signals through interconnect 506 to processor 502.

As described above, trainer 100 executes within processor 502 from memory 504. Specifically, processor 502 fetches computer instructions from trainer 100 and executes those computer instructions. Processor 502, in executing trainer 100, retrieves pair 102 from sound pair database 510, forms exaggerated pair 106, and tests a listener's ability to recognize and identify exaggerated sounds 106A–B of exaggerated pair 106 in the manner described above.

The above description is illustrative only and is not limiting. The present invention is limited only by the claims which follow:

1. A method for training a listener to recognize and identify as distinct a first sound and a second sound, the method comprising:
   forming an exaggerated sound by:
      applying a transformation to the first sound to map the first sound to a first point in a coordinate space having one or more dimensions;
      applying the transformation to the second sound to map the second sound to a second point in the coordinate space;
      fitting a function between the first and second points in the coordinate space;
      determining extrapolation coefficients for extrapolating along the function from the second point away from the first point by a distance to locate a third point in the coordinate space;
      filtering the extrapolation coefficients to form filtered extrapolation coefficients;
      extrapolating using the filtered extrapolation coefficients to determine the third point; and
      applying an inverse of the transformation to the third point to form the exaggerated sound;
   presenting one or more stimulus sounds to the listener wherein the stimulus sounds are each selected from a group consisting of the exaggerated sound and a reference sound which is representative of the first sound; and
   receiving response signals generated by the listener which identify each of the stimulus sounds as a perceived one of the sounds of the group consisting of the exaggerated sound and the reference sound.

2. A method for training a listener to recognize and identify as distinct a first sound and a second sound, the method comprising:
   forming an exaggerated sound by:
      applying a transformation to the first sound to map the first sound to a first point in a coordinate space having one or more dimensions;
      applying the transformation to the second sound to map the second sound to a second point in the coordinate space;
      fitting a function between the first and second points in the coordinate space;
      extrapolating along the function from the second point away from the first point by a distance to locate a third point in the coordinate space;
      determining inverse transformation coefficients for transforming the third point to form the exaggerated sound;
      filtering the inverse transformation coefficients to form filtered inverse transformation coefficients; and
      applying an inverse of the transformation to the third point using the filtered inverse transformation coefficients to form the exaggerated sound;
   presenting one or more stimulus sounds to the listener wherein the stimulus sounds are each selected from a group consisting of the exaggerated sound and a reference sound which is representative of the first sound; and
   receiving response signals generated by the listener which identify each of the stimulus sounds as a perceived one of the sounds of the group consisting of the exaggerated sound and the reference sound.

3. The method of claim 2, wherein extrapolating comprises:
   determining extrapolation coefficients for extrapolating along the function from the second point away from the first point by a distance to locate a third point in the coordinate space;
   filtering the extrapolation coefficients to form filtered extrapolation coefficients; and
   extrapolating using the filtered extrapolation coefficients to determine the third point.

4. A computer readable medium usefull in association with a computer which includes a processor and a memory, the computer readable medium including computer instructions which are configured to cause the computer to train a listener to recognize and identify as distinct a first sound and a second sound by:
   forming an exaggerated sound by:
      applying a transformation to the first sound to map the first sound to a first point in a coordinate space having one or more dimensions;
      applying the transformation to the second sound to map the second sound to a second point in the coordinate space;
      fitting a function between the first and second points in the coordinate space;
      determining extrapolation coefficients for extrapolating along the function from the second point away from the first point by a distance to locate a third point in the coordinate space;
      filtering the extrapolation coefficients to form filtered extrapolation coefficients;
      extrapolating using the filtered extrapolation coefficients to determine the third point; and
      applying an inverse of the transformation to the third point to form the exaggerated sound;
   presenting one or more stimulus sounds to the listener wherein the stimulus sounds are each selected from a group consisting of the exaggerated sound and a reference sound which is representative of the first sound; and
   receiving response signals generated by the listener which identify each of the stimulus sounds as a perceived one of the sounds of the group consisting of the exaggerated sound and the reference sound.

5. A computer readable medium useful in association with a computer which includes a processor and a memory, the computer readable medium including computer instructions which are configured to cause the computer to train a listener to recognize and identify as distinct a first sound and a second sound by:

forming an exaggerated sound by:
applying a transformation to the first sound to map the first sound to a first point in a coordinate space having one or more dimensions;
applying the transformation to the second sound to map the second sound to a second point in the coordinate space;
fitting a function between the first and second points in the coordinate space;
extrapolating along the function from the second point away from the first point by a distance to locate a third point in the coordinate space;
determining inverse transformation coefficients for transforming the third point to form the exaggerated sound;
filtering the inverse transformation coefficients to form filtered inverse transformation coefficients; and
applying an inverse of the transformation to the third point using the filtered inverse transformation coefficients to form the exaggerated sound;

presenting one or more stimulus sounds to the listener wherein the stimulus sounds are each selected from a group consisting of the exaggerated sound and a reference sound which is representative of the first sound; and receiving response signals generated by the listener which identify each of the stimulus sounds as a perceived one of the sounds of the group consisting of the exaggerated sound and the reference sound.

6. The computer readable medium of claim 5 wherein extrapolating comprises:
determining extrapolation coefficients for extrapolating along the function from the second point away from the first point by a distance to locate a third point in the coordinate space;
filtering the extrapolation coefficients to form filtered extrapolation coefficients; and
extrapolating using the filtered extrapolation coefficients to determine the third point.

7. A computer system comprising:
a processor;
a memory operatively coupled to the processor; and
an authentication module (i) which executes in the processor from the memory and (ii) which, when executed by the processor, causes the computer to train a listener to recognize and identify as distinct a first sound and a second sound by:
forming an exaggerated sound by:
applying a transformation to the first sound to map the first sound to a first point in a coordinate space having one or more dimensions;
applying the transformation to the second sound to map the second sound to a second point in the coordinate space;
fitting a function between the first and second points in the coordinate space;
determining extrapolation coefficients for extrapolating along the function from the second point away from the first point by a distance to locate a third point in the coordinate space;
filtering the extrapolation coefficients to form filtered extrapolation coefficients;
extrapolating using the filtered extrapolation coefficients to determine the third point; and
applying an inverse of the transformation to the third point to form the exaggerated sound;

presenting one or more stimulus sounds to the listener wherein the stimulus sounds are each selected from a group consisting of the exaggerated sound and a reference sound which is representative of the first sound; and receiving response signals generated by the listener which identify each of the stimulus sounds as a perceived one of the sounds of the group consisting of the exaggerated sound and the reference sound.

8. A computer system comprising:
a processor;
a memory operatively coupled to the processor; and
an authentication module (i) which executes in the processor from the memory and (ii) which, when executed by the processor, causes the computer to train a listener to recognize and identify as distinct a first sound and a second sound by:
forming an exaggerated sound by:
applying a transformation to the first sound to map the first sound to a first point in a coordinate space having one or more dimensions;
applying the transformation to the second sound to map the second sound to a second point in the coordinate space;
fitting a function between the first and second points in the coordinate space;
extrapolating along the function from the second point away from the first point by a distance to locate a third point in the coordinate space;
determining inverse transformation coefficients for transforming the third point to form the exaggerated sound;
filtering the inverse transformation coefficients to form filtered inverse transformation coefficients; and
applying an inverse of the transformation to the third point using the filtered inverse transformation coefficients to form the exaggerated sound;

presenting one or more stimulus sounds to the listener wherein the stimulus sounds are each selected from a group consisting of the exaggerated sound and a reference sound which is representative of the first sound; and receiving response signals generated by the listener which identify each of the stimulus sounds as a perceived one of the sounds of the group consisting of the exaggerated sound and the reference sound.

9. The computer system of claim 8 wherein extrapolating comprises:
determining extrapolation coefficients for extrapolating along the function from the second point away from the first point by a distance to locate a third point in the coordinate space;
filtering the extrapolation coefficients to form filtered extrapolation coefficients; and
extrapolating using the filtered extrapolation coefficients to determine the third point.

* * * * *